(12) United States Patent
Li et al.

(10) Patent No.: US 12,348,521 B2
(45) Date of Patent: Jul. 1, 2025

(54) VIRTUAL SCOPES FOR RESOURCE MANAGEMENT

(71) Applicant: Microsoft Technology Licensing, LLC, Redmond, WA (US)

(72) Inventors: Weijie Li, Bellevue, WA (US); Bhavesh Chandrakant Doshi, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 351 days.

(21) Appl. No.: 17/743,702

(22) Filed: May 13, 2022

(65) Prior Publication Data
US 2023/0370466 A1    Nov. 16, 2023

(51) Int. Cl.
*H04L 9/40* (2022.01)

(52) U.S. Cl.
CPC ................ *H04L 63/101* (2013.01)

(58) Field of Classification Search
CPC .................................................. H04L 63/101
See application file for complete search history.

(56) References Cited

U.S. PATENT DOCUMENTS

| | | | |
|---|---|---|---|
| 9,021,494 B2* | 4/2015 | Nord | G06F 8/60 718/104 |
| 2007/0283443 A1* | 12/2007 | McPherson | G06F 21/6218 726/28 |
| 2010/0132016 A1* | 5/2010 | Ferris | H04L 63/101 726/4 |
| 2011/0191485 A1* | 8/2011 | Umbehocker | H04L 63/0428 709/229 |
| 2013/0054976 A1* | 2/2013 | Brown | H04L 9/0822 713/189 |
| 2013/0060839 A1* | 3/2013 | Van Biljon | G06F 21/6218 709/203 |
| 2014/0082699 A1* | 3/2014 | Eicken | G06F 21/00 726/4 |
| 2023/0133840 A1* | 5/2023 | Jiménez | H04W 12/086 726/26 |

OTHER PUBLICATIONS

"International Search Report and Written Opinion Issued in PCT Application No. PCT/US23/014198", Mailed Date: Jun. 7, 2023, 13 Pages.

* cited by examiner

*Primary Examiner* — Yonas A Bayou
(74) *Attorney, Agent, or Firm* — Han Gim; Newport IP, LLC

(57) ABSTRACT

A method of controlling access to resource objects in a cloud-based storage system, and application server therefor, includes defining role-based access scopes and user-based virtual scopes for resources in the cloud-based storage system. A role-based access scope is used to define actions that may be performed with a requested resource based on a role of the user making the request. A virtual scope is used to define actions that may be performed with a requested resource based on the user making the request. The virtual scope is used to restrict access to a resource to one or more of the members assigned to a role.

20 Claims, 8 Drawing Sheets

VIRTUAL SCOPES FOR RESOURCE MANAGEMENT

BACKGROUND

In today's computing environments, many organizations make use of cloud-based data management services to provide a cloud-based data storage system that enables files to be created, stored, accessed, and modified. Controlling access to the file system of a cloud storage system is a critical function of most organizations. Access control on an organization level is typically implemented using role-based access control (RBAC). Under RBAC, members of an organization are assigned to one or more predefined roles/groups and access rights are assigned to the roles/groups.

Currently, under the RBAC permission model, when a role/group is defined as having certain access rights to a resource, all members assigned to that role/group will have the same access rights. There is a need for systems and methods that can prevent users from having access to a resource even when they are assigned to a role that would otherwise give them access.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

SUMMARY

Figure 1:
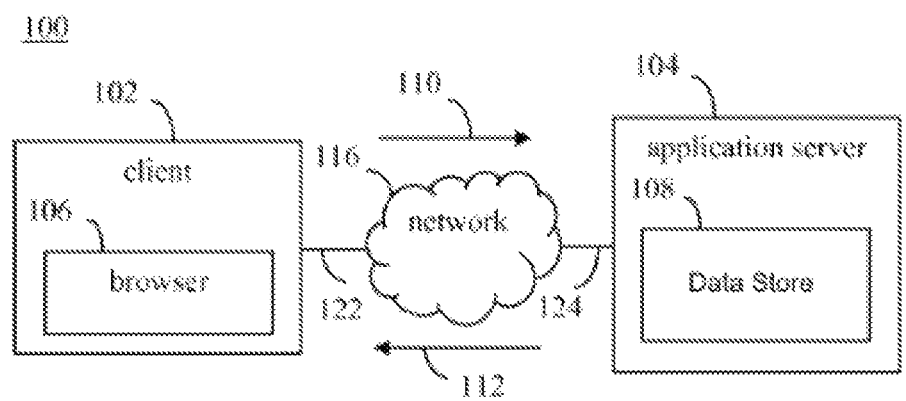
FIG. 1 depicts an example system upon which aspects of this disclosure may be implemented.

In one general aspect, the instant disclosure presents a method of controlling access to resource objects in a cloud-based storage system. The method includes receiving an access request from a client device at an application server. The access request includes information identifying a user associated with the access request, a role of the user, a requested resource for which access is requested, and a requested operation to be performed with the requested resource. A virtual scope of the user is then determined by accessing a virtual scope list for the requested resource. The virtual scope list includes one or more virtual scope entries, each of the one or more virtual scope entries identifying at least one user and defining a virtual scope of access for the at least one user. An access scope for the role of the user is determined by accessing an access control list for the requested resource. The access control list includes one or more access control entries, each of the one or more access control entries identifying at least one role and defining an access scope for the at least one role. It is then determined whether the requested operation is in the virtual scope of the user and the access scope of the role of the user. If the requested operation is in the virtual scope of the user and the access scope of the role of the user, the user is granted access to the requested resource to perform the requested operation.

In a further general aspect, the instant disclosure presents a non-transitory computer readable medium on which are stored instructions that, when executed, cause a programmable device to perform functions. The functions include implementing a file system having a plurality of resources on an application server and receiving an access request from a client device at the application server. The access request includes information identifying a user associated with the access request, a role of the user, a requested resource of the file system for which access is requested, and a requested operation to be performed with the requested resource. A virtual scope of the user is then determined by accessing a virtual scope list for the requested resource. The virtual scope list includes one or more virtual scope entries, each of the one or more virtual scope entries identifying at least one user and defining a virtual scope of access for the at least one user. An access scope for the role of the user is determined by accessing an access control list for the requested resource. The access control list includes one or more access control entries, each of the one or more access control entries identifying at least one role and defining an access scope for the at least one role. It is then determined whether the requested operation is in the virtual scope of the user and the access scope of the role of the user. If the requested operation is in the virtual scope of the user and the access scope of the role of the user, the user is granted access to the requested resource to perform the requested operation.

In a further general aspect, the instant application presents an application server having a processor and a memory. Programmed instructions are stored in the memory that, when executed by the processor, cause a programmable device to perform multiple functions. The functions include implementing a file system including plurality of resources and implementing an access control system including access control lists and virtual control lists. The functions also include receiving an access request from a client device at an application server. The access request includes information identifying a user associated with the access request, a role of the user, a requested resource for which access is requested, and a requested operation to be performed with the requested resource. A virtual scope of the user is then determined by accessing a virtual scope list for the requested resource. The virtual scope list includes one or more virtual scope entries, each of the one or more virtual scope entries identifying at least one user and defining a virtual scope of access for the at least one user. An access scope for the role of the user is determined by accessing an access control list for the requested resource. The access control list includes one or more access control entries, each of the one or more access control entries identifying at least one role and defining an access scope for the at least one role. It is then determined whether the requested operation is in the virtual scope of the user and the access scope of the role of the user. If the requested operation is in the virtual scope of the user and the access scope of the role of the user, the user is granted access to the requested resource to perform the requested operation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Cloud-based data management services provide a cloud-based data storage system that enables files to be created, stored, accessed, and modified. Examples of such cloud-based data management services include Microsoft SharePoint® which provides a cloud-based service for members of an organization to create and collaborate on files and Microsoft OneDrive which provides a cloud storage service that enables members of an organization to store and share files. Cloud-based data storage is typically implemented using a client/server architecture in which data is stored in a file system on one or more remote file servers or data storage devices. Clients can access the data from different locations via the internet providing a convenient way for multiple individuals of an organization to have access to the same files.

Controlling access to the file system of a cloud storage system is a critical function of most organizations. Access control is typically implemented using role-based access control (RBAC). Under RBAC, members of an organization are assigned to one or more predefined roles and access rights, or permissions, are assigned to these roles. The permissions assigned to a role depend on the type of resource being accessed and the types of access made available by the file system. Examples of permissions that may be assigned to roles include the ability to create, read, write, execute, change ownership, change permissions, delete, and download resources. Roles are typically defined based on job function with permissions being defined based on the authority and responsibilities associated with a job function. Permissions are typically assigned to roles based on the principle of least privileged. In other words, a role is assigned the minimum permission(s) that allow a user in that role to perform only what is required for that role.

To implement RBAC, an access control list (ACL) is defined for each resource in the file system. Resources may include files, folders, and web pages which are stored in a file system arranged in a directory structure. The ACL for a resource includes access control entries. Each access control entry includes information identifying at least one role allowed to have access to the resource and the scope of that access. Currently, under the RBAC permission model, when a role is defined as having certain access rights to a resource, all members assigned to that role will have the same access rights.

One challenge faced in utilizing RBAC, is overexposing of resources. This happens when a user or group gains access to a resource that was not intended to have access. For example, a user may be working on a sensitive project and create some private documents within a folder that the user does not want others to see. Using RBAC, all members having the same role as the user will have access to the documents. As another example, a document may be shared with a first security group. Later, a second security group is added as a member of the first security group so all users in second security group gain access to the document. Preventing the overexposing of resources is an important goal for an organization.

To address these technical problems and more, in an example, this description provides technical solutions in the form of virtual scopes which may be assigned to a resource to limit the scope of access to a resource on a user basis and may be used to supplement the role-based access control systems of organizations. Each virtual scope defines an action or operation that may be performed with a resource and lists one or more users or groups who have permission to perform that action. Examples of virtual scopes that may be implemented include a visible scope, a readable scope, a writable scope, a deletable scope, a downloadable scope, an ACL permission granting scope, and a sub resource creation scope. The visible scope is a list of users or groups who are permitted to see a resource. The readable scope is a list of users or groups who are permitted to read a resource. The writable scope is a list of users or groups who are permitted to update a resource. The deletable scope is a list of users or groups who are permitted to delete a resource. The downloadable scope is a list of users or groups who are permitted to download a resource. The ACL permission granting scope is a list of users and groups who are permitted to grant ACL permissions of a resource to other users or groups. The sub resource creation scope is a list of users or groups who are permitted to create or upload sub resources to the parent resource if the parent resource is container type resource like folder, site, etc.

In order to perform the action associated with a virtual scope (i.e., view, read, write, delete, download, grant ACL permissions, and create sub resources in a folder), a user or group listed in the virtual scope must also have the ability to perform that action based on the access scope of the user's assigned role. For example, a user granted the downloadable virtual scope of a resource must also be assigned to a role that is permitted to download the resource to be able to download the resource. If a user requesting to perform an action with a resource does not have both virtual scope access and role-based access to the resource, the user will be prevented from accessing that resource to perform the desired action. For example, a user that wants to download a resource but is not listed in the downloadable virtual scope for the resource would be prevented from downloading the resource even if the user is assigned to a role that would otherwise be permitted to download the resource. Similarly, a user having the required virtual scope access to a resource but not the required role-based access for a resource would be prevented from accessing the resource.

One or more virtual scopes for a resource may be defined by an owner of the resource at any time during the life of the resource. In embodiments, virtual scope access may be implemented using virtual scope lists. A virtual scope list for a resource may include respective virtual scope entries pertaining to different virtual scopes that have been defined for the resource. For example, if a visible scope is defined for a resource, a visible scope entry may be included in the virtual scope list that identifies the user or groups granted the visible scope. In embodiments, a virtual scope list for a resource may include virtual scope entries only for the virtual scopes for that are being utilized for the resource. In some cases, if no visual scopes have been defined for a resource, a visual scope list may not be provided for the resource.

As will be understood by persons of skill in the art upon reading this disclosure, benefits and advantages provided by such implementations can include, but are not limited to, a technical solution to the technical problems associated with overexposing of resources in a RBAC system. Technical solutions and implementations provided herein offer mechanisms for defining and utilizing virtual scopes to control access to resources on a user-basis that may be utilized with an RBAC system. The benefits made available by these technology-based solutions achieve manageable and secure resource isolation.

FIG. 1 illustrates an example system 100, upon which aspects of this disclosure may be implemented. The system 100 includes a client 102, an application server 104, and a network 116. Client 102 may be any type of computing device, including a desktop computer (e.g., a personal computer), a mobile computer or computing device (e.g., a laptop computer, notebook computer, etc.), a smart phone, or other type of computing device.

Application server 104 is configured to implement a cloud-based data storage system that is accessible to client 102. To this end, application server 104 may include one or more servers, which may be any type of computing device described herein or otherwise known, and one or more data stores, such as data store 108, that enable a file system for a cloud-based data storage system to be implemented. Client 102 and application server 104 are communicatively coupled by network 116. Network 116 may include one or more communication links and/or communication networks, such as a PAN (personal area network), a LAN (local area network), a WAN (wide area network), or a combination of networks, such as the Internet. First and second communication links 122 and 124, which respectively couple client 102 and application server 104 to network 116, may include any number of communication links, including wired and/or wireless links, such as IEEE 802.11 wireless LAN (WLAN) wireless links, Worldwide Interoperability for Microwave Access (Wi-MAX) links, cellular network links, wireless personal area network (PAN) links (e.g., Bluetooth links), Ethernet links, USB links, etc.

Figure 2:
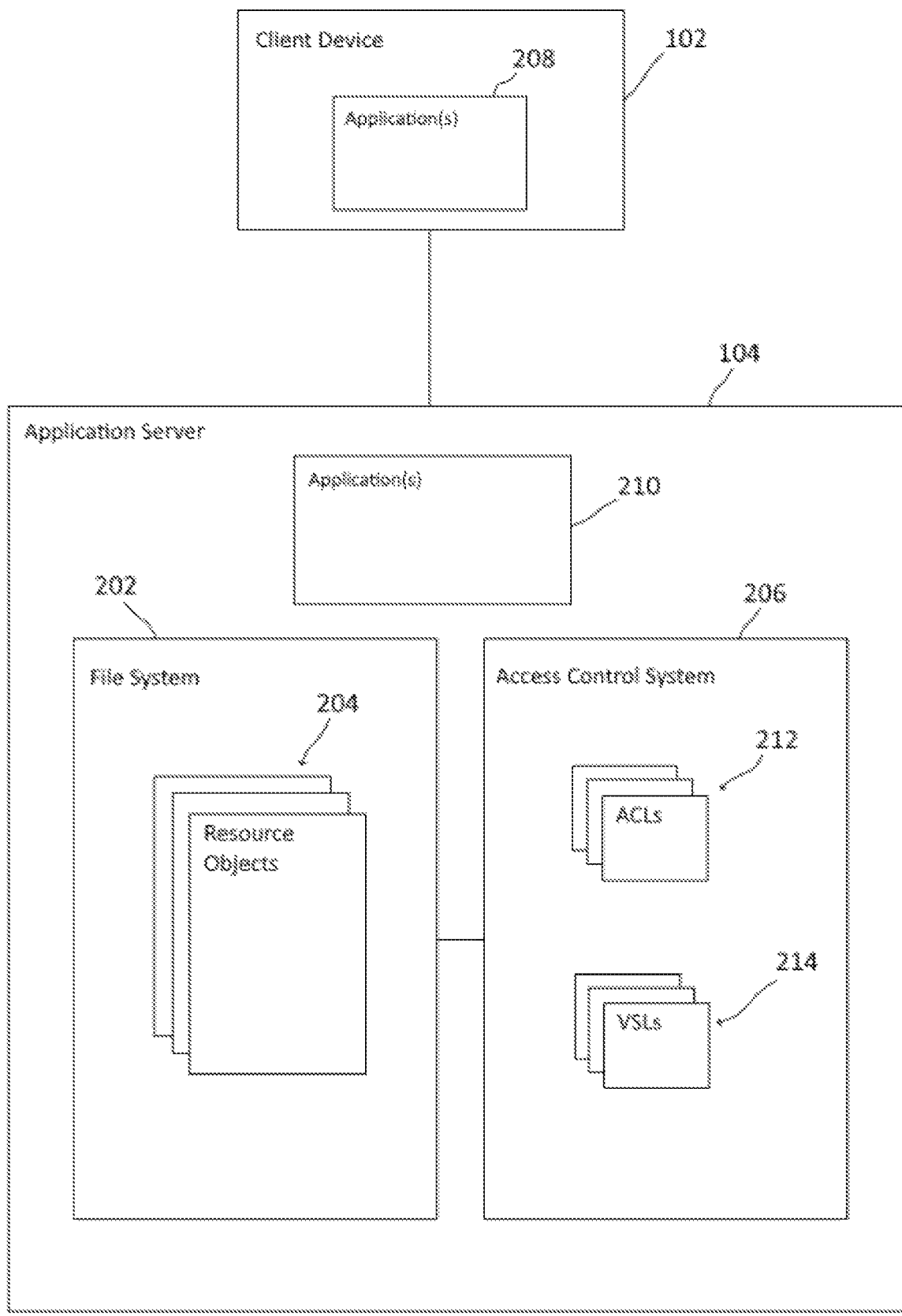
FIG. 2 is a block diagram showing the client device and application server of FIG. 1.

System 100 is configured to enable client computer systems, such as client device 102, to access the file system implemented on the application server 104. An implementation of client device 102 and application server 104 that enables client device 102 to access the file system of the application server is depicted in FIG. 2. The application server 104 includes a file system 202 that enables the client device 102 to create, store and access resource objects 204 of the file system 202, such as files, folders, and web pages. Resource objects 204 may be organized in a hierarchical directory structure on the application server 104. The application server 104 also includes an access control system 206 for controlling access to the resource objects 204 of the file system 202.

The client device 102 and/or the application server 104 may include applications, such as application(s) 208, 210 that enable a user to access the file system 202 of the application server 104. For example, the applications 208, 210 may include a file-browser application that enables a user to view resource objects 204 and navigate through the directory structure of the file system 202. Applications 208, 210 may also include applications that enable a user to perform actions related to resource objects 204 of the file system 202, such as view, read, write, download, create, and delete. Examples of such applications include word processing applications, spreadsheet applications, media control application, and other applications that are capable of opening and manipulating files of different types.

Figure 3:
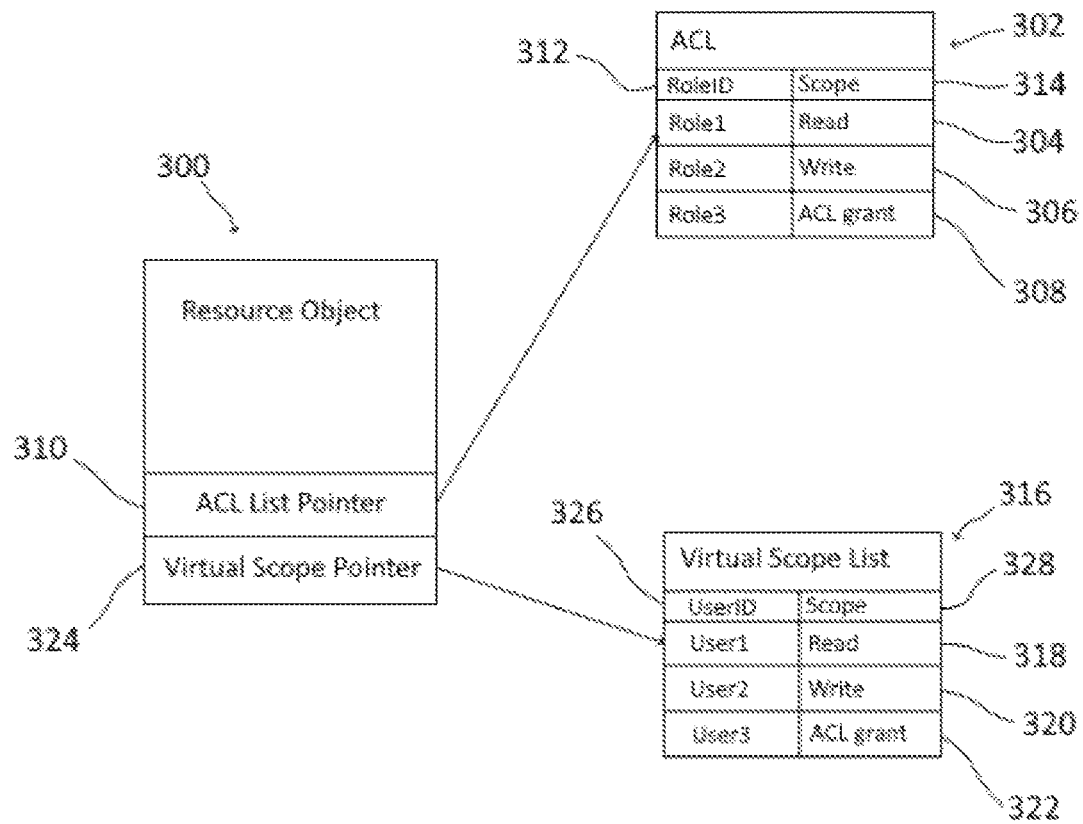
FIG. 3 is a block diagram showing a resource object, an access control list, and a virtual scope list in accordance with the disclosure.

The application control system 206 is configured to implement an RBAC permission model. To this end, application control system includes ACLs 212 for the resource objects 204 to control access to the resource objects 204 based on the role of the user. An example of an ACL for use with a resource object of the file system is depicted in FIG. 3. FIG. 3 shows a resource object 300 and an ACL 302 defined for the resource object 300. In this embodiment, the ACL 302 includes three access control entries 304, 306, 308 pertaining to the resource object 300 although, in embodiments, greater or fewer entries may be included in the list. The ACL 302 may be in the form of a data structure, such as a table, that stores the access control entries. ACLs, such as ACL 302, may be stored in a memory of the application server 104 in association with the resource objects for which they are defined. In embodiments, resource objects, such as the resource object 300 of FIG. 3, may include a pointer 310, or similar type of structure, that points to the ACL, such as ACL 302, defining the role-based access rights for the resource object. Different ACLs may be defined for different resource objects. In some cases, a single ACL may be utilized to provide role-based access control for two or more resource objects of the file system.

Each access control entry 304, 306, 308 in the ACL includes a role field 312 and a scope field 314. The role field 312 includes information, such as a role ID, that identifies a predefined role within an organization. The scope field 314 includes information that defines the access scope assigned to the role in the role field. Examples of access scopes that may be assigned to a role in the action field include read, write, create, delete, download, and ACL permission granting. In the embodiment of FIG. 3, a first access control entry 304 grants a read permission to the role designated Role1; a second access control entry 306 grants a write permission to the role designated Role2; and a third access control entry 308 grants permission to the role designated Role3 to grant ACL permissions of the resource object 300.

The access control system 206 is also configured to implement a virtual scope permission model. As depicted in FIG. 2, the virtual scope permission model is implemented using virtual scope lists, or VSLs 214, to define virtual scopes for the resource objects. Each virtual scope list 214 is associated with one of the resource objects 204 and includes one or more virtual scope entries. An embodiment of a virtual scope list 316 is depicted in FIG. 3. Virtual scope lists, such as the virtual scope list 316, may be in the form of a data structure, such as a table, that stores the virtual scope entries 318, 320, 322. Virtual scope lists, such as virtual scope list 316, may be stored in a memory of the application server 104 in association with the resource objects, such as resource object 300, for which they are defined. As depicted in FIG. 3, the resource object 300 associated with the virtual scope list 316 may include a pointer 324, or similar type of structure, that points to the virtual scope list 316 defining its virtual scope permissions.

Each of virtual scope entries 318, 320, 322 includes a user field 326 and a virtual scope field 328. The user field 326 includes information, such as one or more usernames or user Ms, that defines the user(s) associated with the virtual scope entry. The virtual scope field 328 includes information that defines the virtual scope assigned to the user(s) identified in the user field 326. The virtual scope field 328 may identify one of a visible scope, a readable scope, a writeable scope, a deletable scope, a downloadable scope, an ACL permission granting scope, and a sub resource creation scope. In the embodiment of FIG. 3, only three virtual scopes are defined for the resource object 300 although, in other embodiments, more or fewer virtual scopes may be defined for the resource object. In the embodiment of FIG. 3, a first virtual scope entry 318 grants a read permission to the user designated User1; a second virtual scope entry 320 grants a write permission to the user designated User2; and a third virtual scope entry 322 gives the user designated User3 permission to grant or change ACL permissions of the resource object.

Figure 5:
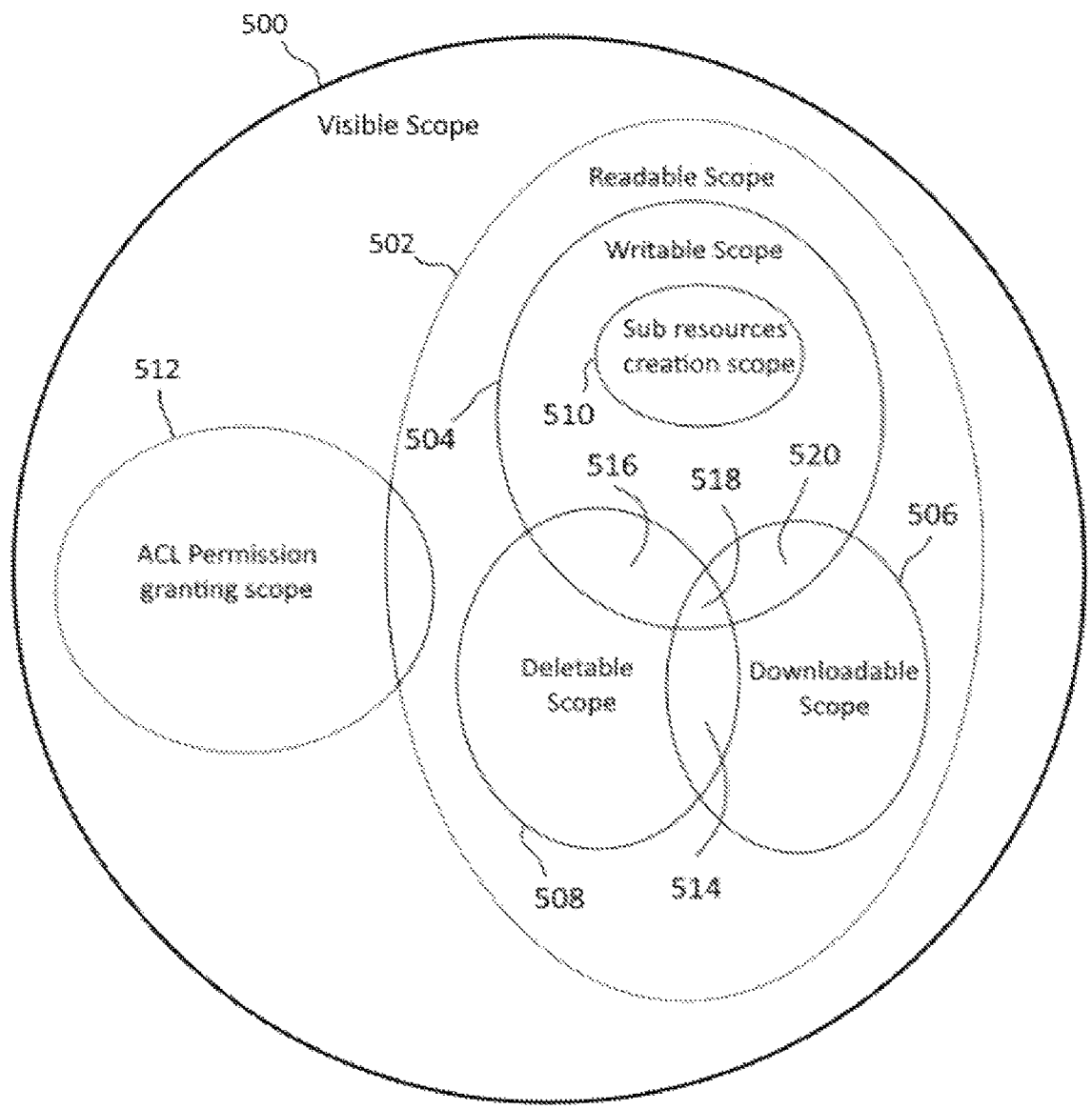
FIG. 5 is a Venn diagram showing the relationships between virtual scopes of a resource for a given group of users.

FIG. 5 shows an embodiment in the form of a Venn diagram of how the virtual scopes of a resource object may be related to each other for a given group of users. The visible scope 500 is the least privileged access operation and includes all of the users for which a resource object is visible. All of the users having the visible scope 500 that are not granted any other virtual scope are allowed to see only the resource object. The users granted the readable scope 502 are also granted the visible scope 500 and therefore can see and read a resource object. All of the users granted the writable scope 504, the deletable scope 508 and downloadable scope 506 are also granted the readable scope 502 and therefore can see, read and update a resource object. All users granted the sub resource creation scope 510 are also granted the writable scope 504, the readable scope 502 and the visible scope 500 and therefore can see, read, update and create sub resources for a resource object. The circles that only partially overlap in the Venn diagram show how some users may have different combinations of virtual scopes. For example, some users 514 granted the deletable scope 508 and some users 520 granted the downloadable scope 506 may also be granted the writable scope 504. Some users 518 may be granted the downloadable scope, the deletable scope and the writable scope and therefore can see, read, write, download and delete the resource object. Some users 522 granted the ACL permission granting scope may also be granted the readable scope and therefore can read and set the ACL permissions for a resource object.

Figure 4:
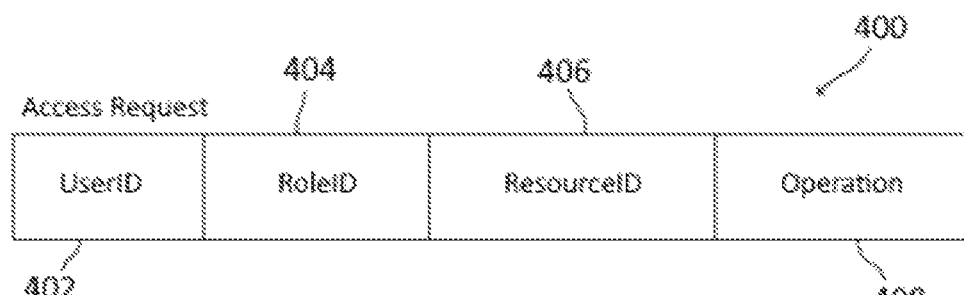
FIG. 4 is a diagram of an embodiment of an access request for requesting access to a resource in a file system.

Resource objects may be accessed from a device by sending an access request to the application server. An example of a resource request 400 is depicted in FIG. 4. A resource request may comprise a data structure that includes a userID field 402, a roleID field 404, a resourceID field 406, and an operation field 408. The userID field 402 is used to identify the userID of the user requesting the access. The roleID field 404 is used to identify the role or mien) of the user requesting the access. The resourceID field 406 is used to identify the resource object for which access is being requested. The operation field 408 identifies the type of access or operation that is being requested to be performed with the resource object. As noted above, examples of operations that may be performed with a resource object include view, read, write, download; delete, create a sub resource, and grant or change ACL permissions.

Figure 6:
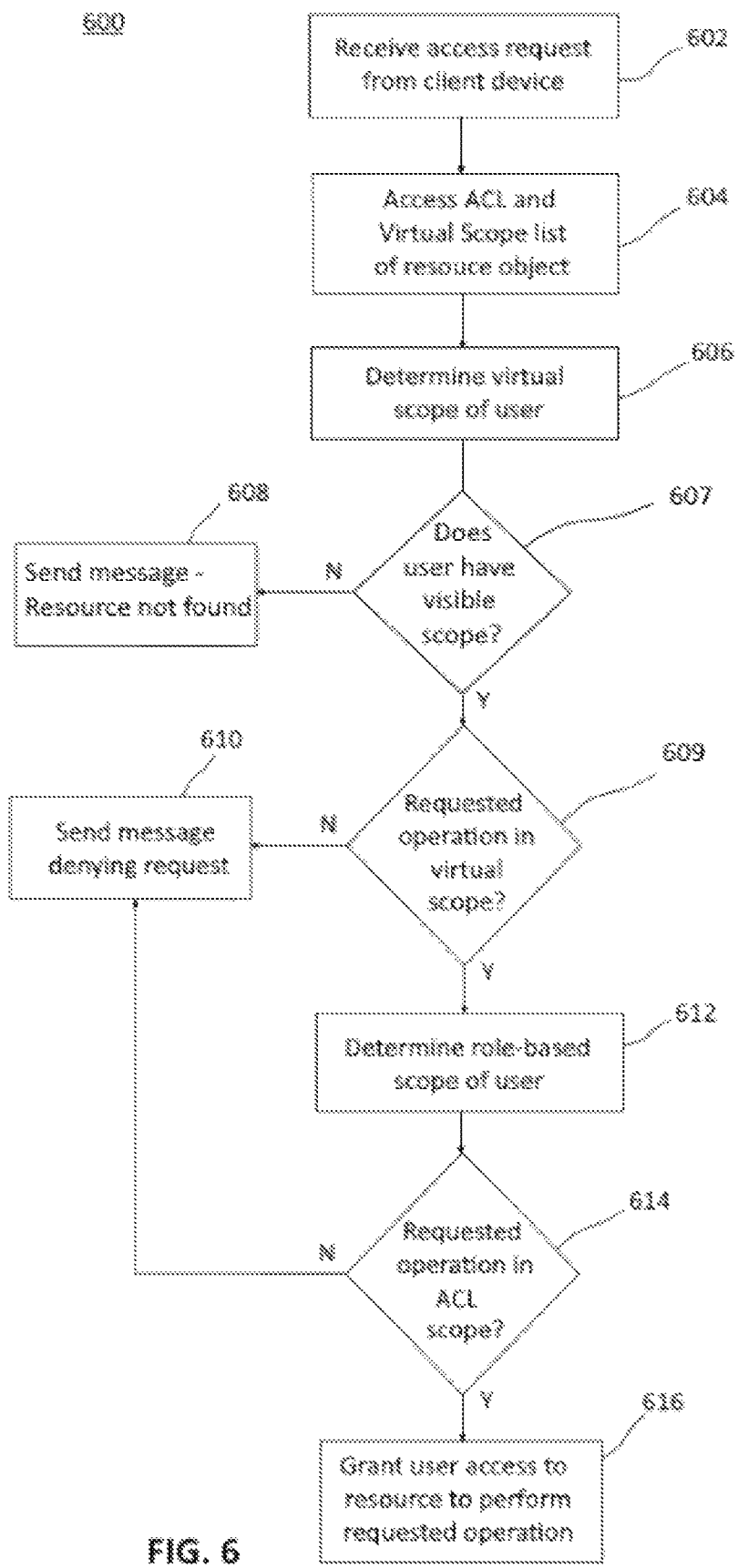
FIG. 6 depicts an embodiment of a method that utilizes virtual scopes in controlling access to resource objects in a file system.

An embodiment of a method 600 that utilizes virtual scopes for controlling access to resource objects in a file system is depicted in FIG. 6. The method 600 begins with receiving a resource request from a client device requesting access to perform an operation with a resource object in the file system of an application server (block 602). The access control system is configured to use the resource ID of the access request to determine which resource object is being requested and to locate the virtual scope list and access control list for that resource, if available (block 604). The access control system is configured to identify whether the user indicated by the userID of the request is included in one of the virtual scope entries on the virtual scope list, and, if so, to determine the virtual scope granted the user (block 606). A determination is then made as to whether the user has the visible scope of the resource, i.e., is allowed to see the resource (block 607). If the user does not have the visible scope or any other virtual scope for the resource, the user is not allowed to see the resource and a message is sent to the client device such as "resource not found" (block 608). A user may be listed in the visible scope of a resource if the user has been assigned the visible scope, or if the user has been assigned any other virtual scope which also grants the user permission to see the resource, e.g., readable writable, downloadable, deletable, sub resource creating, and ACL permission granting scope. If the user does have the visible scope, the method then proceeds to block 609 to determine whether the requested operation is included the virtual scope of the user. For example, if the operation field of the access request indicates a read operation is requested, then the access control system determines whether the read operation is within the virtual scope granted to the user.

If the requested operation is not in the virtual scope of the user, a message is returned to the client device denying the requested access to the resource (block 610). If the requested operation is in the virtual scope of the user, the access control system checks the ACL for access control entries including the role ID of the user requesting the access and determines the ACL scope of the role of the user (block 612). A determination is then made as to whether the requested operation is included in the ACL scope of the role of the user (block 614). If the requested operation is not in the scope of the role of the user, a message is returned to the client device denying the requested access to the resource (block 610). If the requested operation is in the scope of the role of the user, then a message is sent to the client device that grants access to requested resource to perform the requested operation (block 612).

Figure 7:
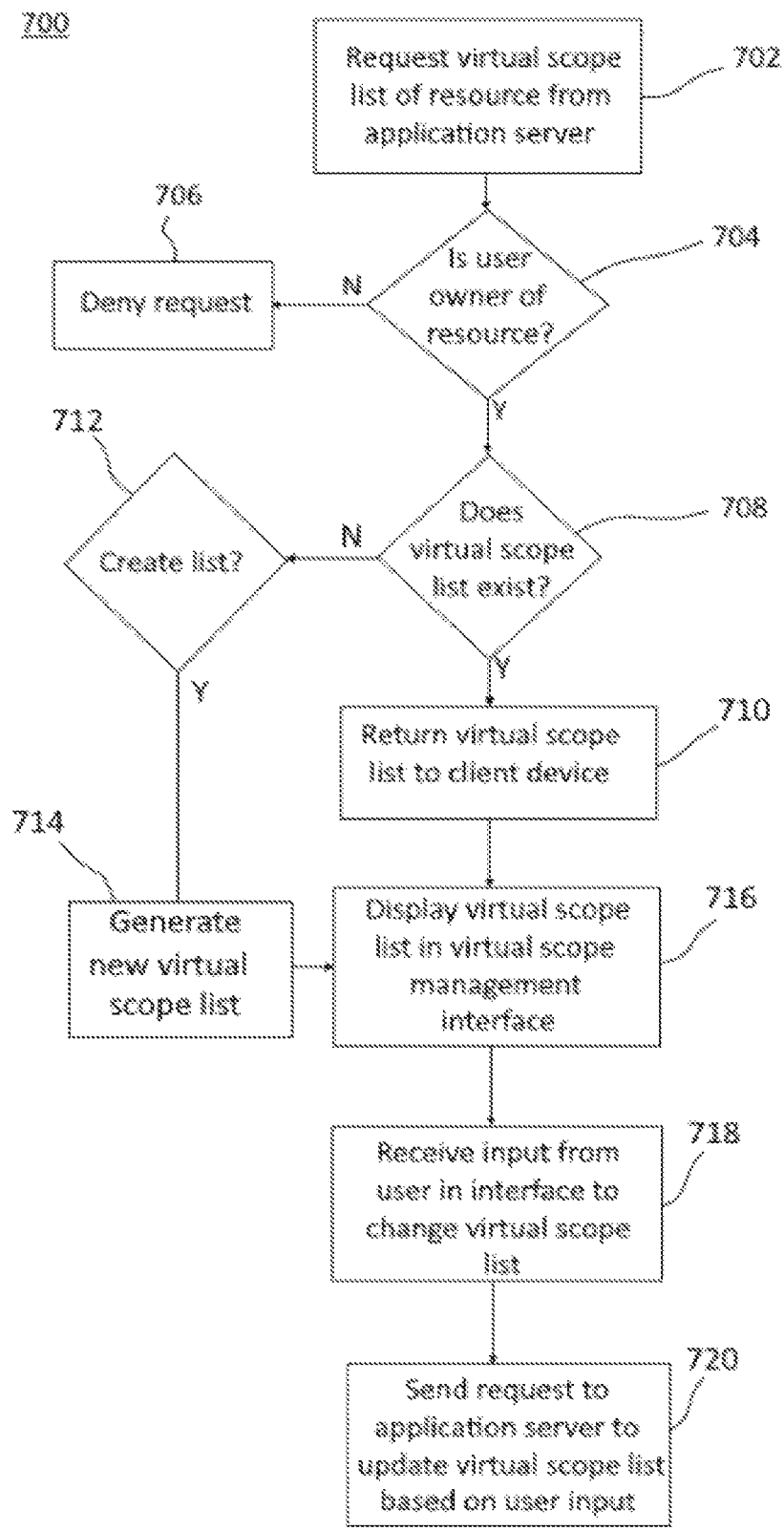
FIG. 7 depicts an embodiment of a method of defining a virtual control list for a resource in a file system.

The virtual scopes for resource objects may be defined by a resource owner in any suitable manner. An embodiment of a method 700 of setting and managing the virtual scopes of resources is depicted in FIG. 7. The method 700 begins with sending a request to the application server requesting access to the virtual scope list of a resource (block 702). The request may include identification information pertaining to the user making the request and the information identifying the resource for which the virtual scope list is being requested. The application server may then determine whether the user associated with the request is the owner of the resource (block 704), If the user associated with the request is not the owner of the resource, the application server sends a message to the client device denying the request (block 706). If the user is the owner of the resource, a determination is made as to whether a virtual scope list exists for the resource (block 708). If the virtual scope list does exist, then the virtual scope list is returned to the client device (block 710). At this point, the option may be presented to the client device to create a new virtual scope list (block 712). If the user wants to create a virtual scope list, a new virtual scope list is generated having default virtual scope entries or no virtual scope entries (block 714). In either case, the virtual scope list is displayed in a virtual scope management interface implemented in the client device that enables virtual scope entries in the list to be created, deleted, and modified by the user (block 718). For example, users may be added to or removed from virtual scope entries, entries may be created pertaining to other virtual scopes, and entries may be deleted. Once the user is done modifying the virtual scope list in the interface, a request is sent to the to the application server to update the virtual scope list with the information entered into the interface (block 720). The application server receives the request and updates the virtual scope list of the resource.

The detailed examples of systems, devices, and techniques described in connection with FIGS. 1-7 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-7 may be implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including, processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 8:
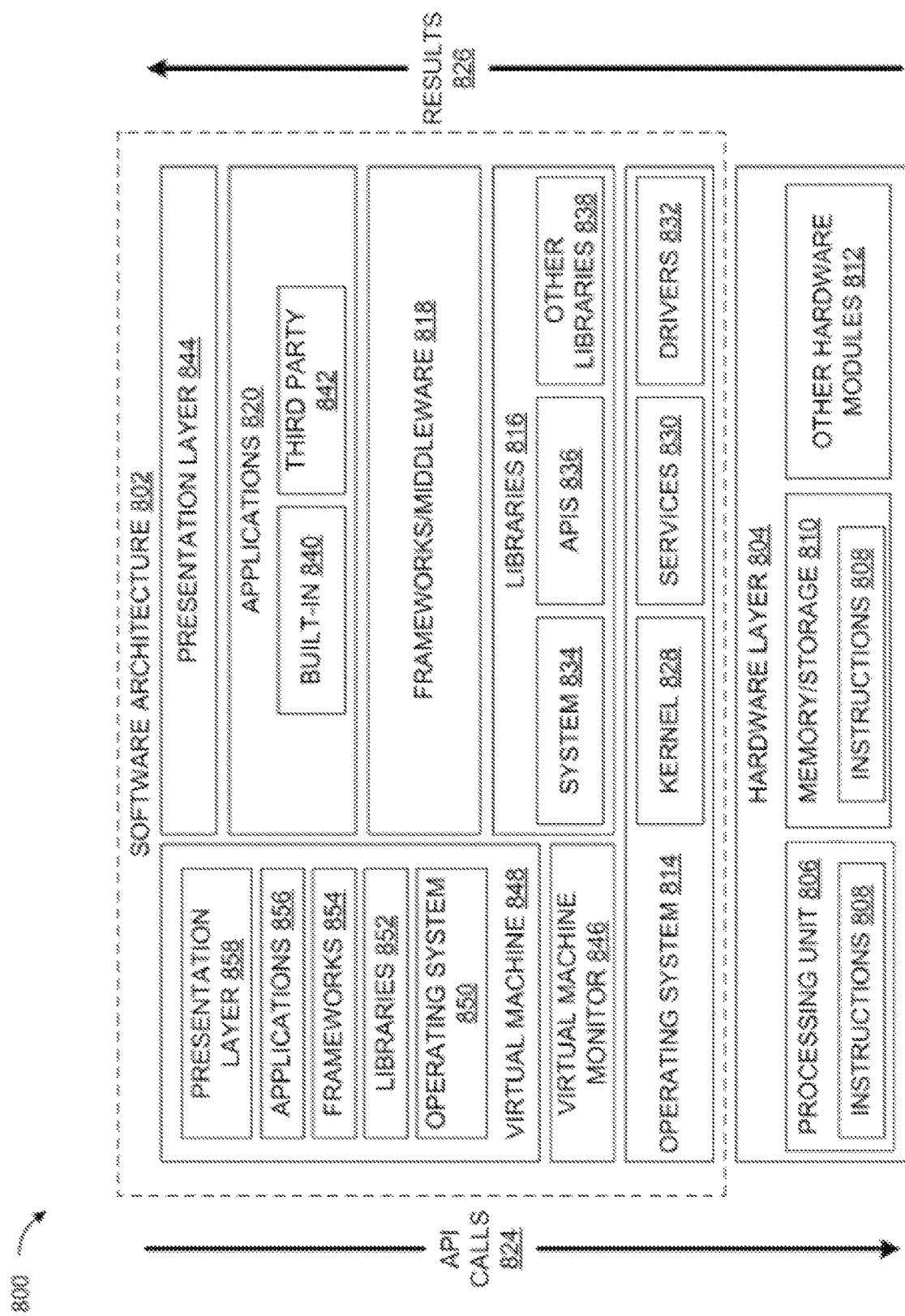
FIG. 8 is a block diagram illustrating an example software architecture, various portions of which may be used in conjunction with various hardware architectures herein described.

FIG. 8 is a block diagram 800 illustrating an example software architecture 802, various portions of which may be used in conjunction with various hardware architectures herein described, which may implement any of the above-described features. FIG. 8 is a non-limiting example of a software architecture, and it will be appreciated that many other architectures may be implemented to facilitate the functionality described herein. The software architecture 802 may execute on hardware such as a machine 900 of FIG. 9 that includes, among other things, processors 910, memory 930, and input/output (i/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
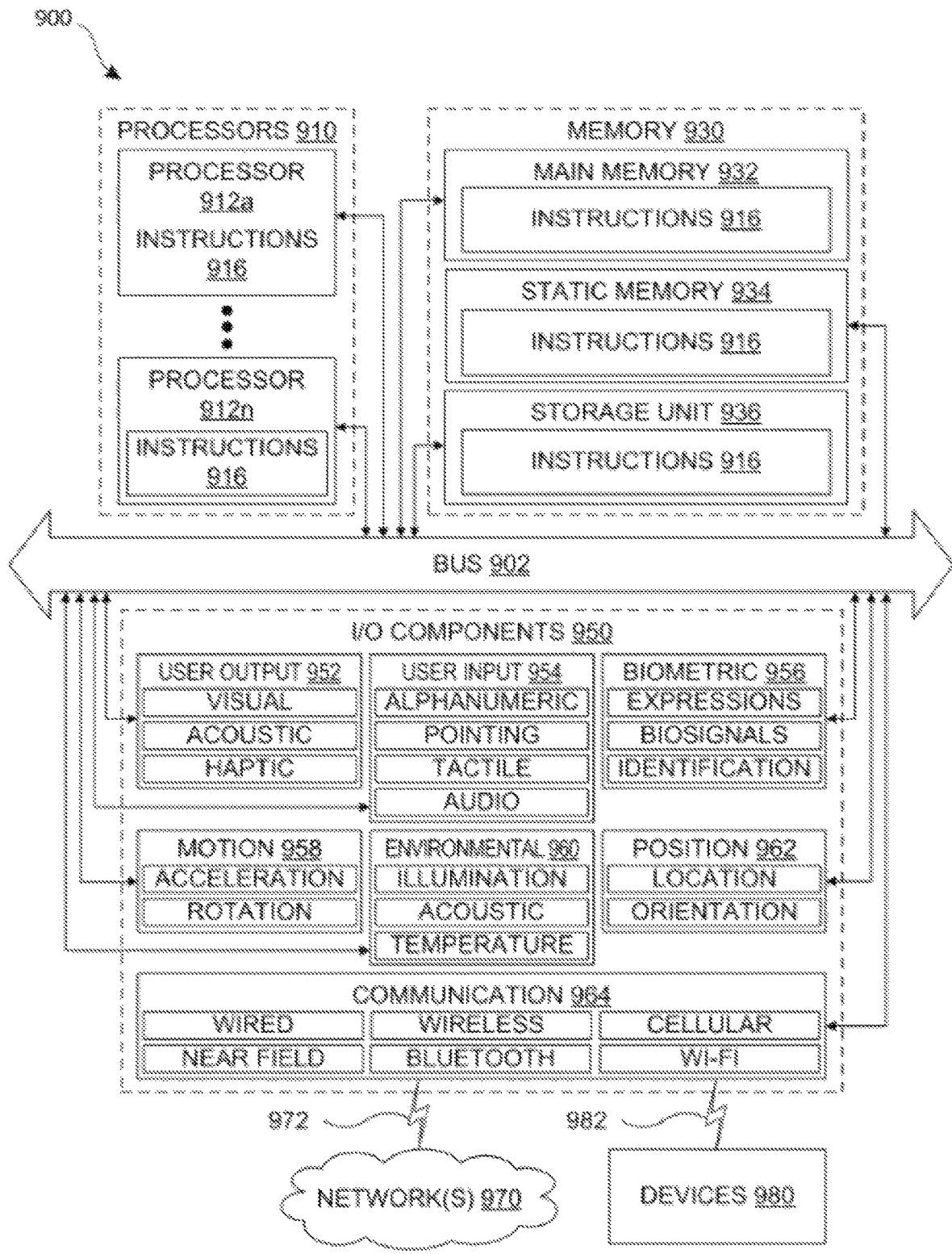
FIG. 9 is a block diagram illustrating components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example, Thus, the following claims are hereby incorporated into the Detailed Description, with each claim standing on its Own as a separately claimed subject matter.

What is claimed is:

1. A method of controlling access to resource objects in a cloud-based storage system, the method comprising:
   receiving an access request from a client device at an application server, the access request including information identifying a user associated with the access request, a role of the user, a requested resource for which access is requested, and a requested operation to be performed with the requested resource;
   determining a virtual scope for the user by accessing a virtual scope list for the requested resource, the virtual scope list including one or more virtual scope entries, each of the one or more virtual scope entries identifying at least one user and defining a virtual scope of access for the at least one user, the virtual scope defining a scope of operations permitted for the user and the virtual scope being independent of any operations permitted to users based on roles of the users as defined by a role-based access control system;
   determining an access scope for the role of the user according to the role-based access control system by accessing an access control list for the requested resource, the access control list including one or more access control entries, each of the one or more access control entries identifying at least one role and defining an access scope for the at least one role, the access scope defining a scope of operations permitted for the role of the user;
   determining whether the requested operation is in the virtual scope of operations permitted for the user and the access scope of operations permitted for the role of the user;
   when the requested operation is in the virtual scope of operations for the user and in the access scope of operations for the role of the user, granting the user access to the requested resource to perform the requested operation; and
   when the requested operation either is not in the virtual scope of the user or is not in the access scope of the role of the user, denying the user access to the requested resource to perform the requested operation.

2. The method of claim 1, further comprising:
   if the requested operation is not in the virtual scope of the user or is not in the access scope of the role of the user, denying the user access to the requested resource to perform the requested operation.

3. The method of claim 1, wherein the virtual scope is one of a visible scope, a readable scope, a writable scope, a downloadable scope, a deletable scope, a sub resource creation scope, and a permission granting scope.

4. The method of claim 1, wherein
   when the virtual scope of operations for the user does not include a visible scope, a message is sent to the client device indicating that the requested resource is not found; and
   when the virtual scope of operations for the user does include the visible scope and when the requested operation is not in the virtual scope of operations for the user or is not in the access scope of operations for the role of the user, a message is sent to the client device indicating that the access request is denied.

5. The method of claim 1, wherein each of the virtual scope entries is used to define user access to a different one of the virtual scopes of operations permitted for the user and each of the access control entries is used to define access to a different one of the access scopes of operations permitted for the role of the user.

6. The method of claim 5, wherein the virtual scope list is defined by an owner of the requested resource.

7. The method of claim 1, wherein the cloud-based storage system includes a plurality of resources, the requested resource being one of resources in the plurality of resources, and
wherein each of the resources in the plurality of resources includes a virtual control list.

8. The method of claim 7, wherein the plurality of resources includes files and folders on the cloud-based storage system.

9. A non-transitory computer readable medium on which are stored instructions that, when executed, cause a programmable device to perform functions of:
implementing a file system including plurality of resources on an application server, each of the plurality of resources comprising one of a document, a file, and a folder in which one or more documents or files are stored, the file system being implemented with a role-based access control and a virtual scope access control for the plurality of resources;
receiving an access request from a client device at the application server, the access request including information identifying a user associated with the access request, a role of the user, a requested resource for which access is requested, and a requested operation to be performed with the resource;
determining a virtual scope for the user by accessing a virtual scope list for the requested resource, the virtual scope list including one or more virtual scope entries, each of the one or more virtual scope entries identifying at least one user and defining a virtual scope of access for the at least one user, the virtual scope defining a scope of operations permitted for the user and the virtual scope being independent of any operations permitted to users based on roles of the users as defined by a role-based access control system;
determining an access scope for the role of the user according to the role-based access control system by accessing an access control list for the requested resource, the access control list including one or more access control entries, each of the one or more access control entries identifying at least one role and defining an access scope for the at least one role, the access scope defining a scope of operations permitted for the role of the user;
determining whether the requested operation is in the virtual scope of operations permitted for the user and the access scope of operations permitted for the role of the user;
when the requested operation is in the virtual scope of operations for the user and in the access scope of operations for the role of the user, granting the user access to the requested resource to perform the requested operation; and
when the requested operation either is not in the virtual scope of the user or is not in the access scope of the role of the user, denying the user access to the requested resource to perform the requested operation.

10. The non-transitory computer readable medium of claim 9, further comprising:
if the requested operation is not in the virtual scope of the user or is not in the access scope of the role of the user, denying the user access to the requested resource to perform the requested operation.

11. The non-transitory computer readable medium of claim 10, wherein
when the virtual scope of operations for the user does not include a visible scope, a message is sent to the client device indicating that the requested resource is not found; and
when the virtual scope of operations for the user does include the visible scope and when the requested operation is not in the virtual scope of operations for the user or is not in the access scope of operations for the role of the user, a message is sent to the client device indicating that the access request is denied.

12. The non-transitory computer readable medium of claim 10, wherein when the virtual scope of operations for the user does not include a visible scope, a message is sent to the client device indicating that the requested resource is not found; and
when the virtual scope of operations for the user does include the visible scope and when the requested operation is not in the virtual scope of operations for the user or is not in the access scope of operations for the role of the user, a message is sent to the client device indicating that the access request is denied.

13. The non-transitory computer readable medium of claim 12, wherein the virtual scope list is defined by an owner of the requested resource.

14. The non-transitory computer readable medium of claim 9, wherein the virtual scope is one of a visible scope, a readable scope, a writable scope, a downloadable scope, a deletable scope, a sub resource creation scope, and a permission granting scope.

15. The non-transitory computer readable medium of claim 9, wherein the file system includes a plurality of resources, the requested resource being one of resources in the plurality of resources, and
wherein each of the resources in the plurality of resources includes a virtual control list.

16. The non-transitory computer readable medium of claim 9, wherein the plurality of resources include files and folders on the cloud-based storage system.

17. An application server comprising:
a processor;
a memory;
programmed instructions stored in the memory that, when executed by the processor, cause a programmable device to perform functions of:
implementing a file system including plurality of resources, each of the plurality of resources comprising one of a document, a file, and a folder in which one or more documents or files are stored, the file system being implemented with a role-based access control and a virtual scope access control for the plurality of resources;
receiving an access request from a client device, the access request including information identifying a user associated with the access request, a role of the user, a requested resource of the plurality of resources for which access is requested, and a requested operation to be performed with the requested resource;

determining a virtual scope for the user by accessing a virtual scope list for the requested resource, the virtual scope list including one or more virtual scope entries, each of the one or more virtual scope entries identifying at least one user and defining a virtual scope of access for the at least one user, the virtual scope defining a scope of operations permitted for the user and the virtual scope being independent of any operations permitted to users based on roles of the users as defined by a role-based access control system;

determining an access scope for the role of the user according to the role-based access control system by accessing an access control list for the requested resource, the access control list including one or more access control entries, each of the one or more access control entries identifying at least one role and defining an access scope for the at least one role, the access scope defining a scope of operations permitted for the role of the user;

determining whether the requested operation is in the virtual scope of operations permitted for the user and the access scope of operations permitted for the role of the user;

when the requested operation is in the virtual scope of operations for the user and in the access scope of operations for the role of the user, granting the user access to the requested resource to perform the requested operation; and when the requested operation either is not in the virtual scope of the user or is not in the access scope of the role of the user, denying the user access to the requested resource to perform the requested operation.

18. The application server of claim 17, further comprising:
if the requested operation is not in the virtual scope of the user or is not in the access scope of the role of the user, denying the user access to the requested resource to perform the requested operation.

19. The application server of claim 17, wherein the virtual scope is one of a visible scope, a readable scope, a writable scope, a downloadable scope, a deletable scope, a sub resource creation scope, and a permission granting scope.

20. The application server of claim 19, wherein each of the virtual scope entries is used to define user access to a different one of the virtual scopes.

* * * * *